US009211876B2

(12) United States Patent
Miwa et al.

(10) Patent No.: US 9,211,876 B2
(45) Date of Patent: Dec. 15, 2015

(54) HYDRAULIC BRAKE DEVICE FOR VEHICLE

(71) Applicants: ADVICS CO., LTD., Kariya-shi (JP); TOYOTA JIDOSHA KABUSHIKI KAISHA, Toyota-shi (JP)

(72) Inventors: Akihiko Miwa, Kariya (JP); Hiroshi Isono, Toyota (JP)

(73) Assignees: ADVICS CO., LTD., Aichi-Pref, Kariya-Shi (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/375,587

(22) PCT Filed: Mar. 21, 2013

(86) PCT No.: PCT/JP2013/058035
§ 371 (c)(1),
(2) Date: Jul. 30, 2014

(87) PCT Pub. No.: WO2013/141289
PCT Pub. Date: Sep. 26, 2013

(65) Prior Publication Data
US 2015/0021977 A1    Jan. 22, 2015

(30) Foreign Application Priority Data

Mar. 23, 2012  (JP) ................................. 2012-067020

(51) Int. Cl.
*B60T 7/00* (2006.01)
*B60T 11/10* (2006.01)
(Continued)

(52) U.S. Cl.
CPC ............... *B60T 11/103* (2013.01); *B60T 7/042* (2013.01); *B60T 8/17* (2013.01); *B60T 11/224* (2013.01); *B60T 13/143* (2013.01); *B60T 13/662* (2013.01); *B60T 13/68* (2013.01); *B60T 13/686* (2013.01)

(58) Field of Classification Search
CPC ..... B60T 13/68; B60T 13/143; B60T 13/662; B60T 13/686; B60T 13/58; B60T 13/12; B60T 11/103; B60T 11/224; B60T 7/042
USPC .............................................. 303/15, 10, 6.01
See application file for complete search history.

(56) References Cited

U.S. PATENT DOCUMENTS 4,736,588 A    4/1988 Leiber
4,843,819 A    7/1989 Leiber
(Continued)

FOREIGN PATENT DOCUMENTS

JP    61-139548 A    6/1986
JP    2002-37052 A    2/2002
(Continued)

OTHER PUBLICATIONS

International Search Report (PCT/ISA/210) mailed on May 14, 2013, by the Japanese Patent Office as the International Searching Authority for International Application No. PCT/JP2013/058035.
(Continued)

*Primary Examiner* — Pamela Rodriguez
(74) *Attorney, Agent, or Firm* — Buchanan Ingersoll & Rooney PC

(57) ABSTRACT

A vehicle brake system includes a first fluid chamber whose volume changes corresponding to the amount of advancement and retraction of the input piston, a second fluid chamber into which hydraulic pressure from a hydraulic pressure source is introduced after adjustment in a pressure regulator, a third fluid chamber kept at the atmospheric pressure, a stroke simulator which generates a reaction force to the brake operation corresponding to a change in volume of the first fluid chamber, a master cylinder, a partition member partitioning each of the second and third fluid chambers from the first fluid chamber, first and second seal members disposed in respective fitting gaps, and an annular member having both ends abutting respective seal members. The annular member divides a space into first and second space portions whose volumes respectively increases and decreases by the same amount when the annular member moves in one axial direction.

8 Claims, 3 Drawing Sheets

(51) Int. Cl.
- *B60T 8/17* (2006.01)
- *B60T 13/68* (2006.01)
- *B60T 11/224* (2006.01)
- *B60T 13/14* (2006.01)
- *B60T 13/66* (2006.01)
- *B60T 7/04* (2006.01)

(56) References Cited

U.S. PATENT DOCUMENTS

| | | | |
|---|---|---|---|
| 6,226,993 B1* | 5/2001 | Heibel | 60/547.3 |
| 8,366,205 B1* | 2/2013 | Mackiewicz et al. | 303/114.1 |
| 2003/0071518 A1 | 4/2003 | Kusano et al. | |
| 2005/0160730 A1 | 7/2005 | Matsuno et al. | |
| 2013/0269338 A1* | 10/2013 | Isono | 60/563 |
| 2015/0021976 A1* | 1/2015 | Miwa et al. | 303/6.01 |

FOREIGN PATENT DOCUMENTS

| | | |
|---|---|---|
| JP | 2003-81081 A | 3/2003 |
| JP | 2005-162139 A | 6/2005 |
| JP | 2006-264358 A | 10/2006 |
| JP | 2010-929 A | 1/2010 |

OTHER PUBLICATIONS

Written Opinion (PCT/ISA/237) mailed on May 14, 2013, by the Japanese Patent Office as the International Searching Authority for International Application No. PCT/JP2013/058035.

* cited by examiner

HYDRAULIC BRAKE DEVICE FOR VEHICLE

TECHNICAL FIELD

This invention relates to a vehicle hydraulic brake system which can perform regenerative cooperative braking and/or automatic braking, and which ensures good brake pedal operating feeling.

BACKGROUND ART

A vehicle hydraulic brake system of the brake-by-wire type is disclosed e.g. in the below-identified Patent document 1. In this brake system, hydraulic pressure supplied from a high hydraulic pressure source is adjusted by a pressure regulator to a value corresponding to brake operation by the driver, or to a value set independently of brake operation by the driver, by an electronic control unit, and brake hydraulic pressure is generated by actuating a master piston of master cylinder using the hydraulic pressure adjusted by the pressure regulator as assist pressure.

The brake system disclosed in FIG. 3 of Patent document 1 includes an input piston configured to be advanced under the brake operating force, a pressure regulator (pressure regulating means) which adjusts hydraulic pressure supplied from a high hydraulic pressure source to a value necessary to generate a target braking force and feed the thus adjusted hydraulic pressure into a third hydraulic pressure chamber (boost chamber), and a master cylinder configured to generate brake hydraulic pressure by driving a master piston (intermediate piston) under the hydraulic pressure adjusted by the pressure regulator.

The input piston is axially slidably inserted in a hole formed in the rear end of the master piston such that the front end of the input piston protrudes into a relief chamber defined in the master piston. The rear end of the master piston protrudes into the third fluid chamber. The gap between the relief chamber of the master piston and the third fluid chamber is sealed by a high-pressure seal disposed between the inner peripheral surface of the bore of the master piston and the outer periphery of the input piston.

PRIOR ART DOCUMENT(S)

Patent Document(s)

Patent document 1: Japanese Patent Publication 2010-929A

SUMMARY OF THE INVENTION

Object of the Invention

In the brake system disclosed in FIG. 3 of Patent document 1, when hydraulic pressure adjusted by the pressure regulator is introduced into the third fluid chamber, this hydraulic pressure acts on the back surface of the master piston of the master cylinder, thus advancing the master piston. When the master piston is advanced, the input piston is pulled forwardly by the master piston due to sliding resistance generated by the high-pressure seal disposed between the master piston and the input piston. This causes the reaction force to braking operation not to correspond to the brake operating amount, deteriorating the brake operating feeling.

An object of the present invention is to provide a brake-by-wire vehicle hydraulic brake system of the type disclosed in Patent document 1 which is free of the problem of deterioration in brake operating feeling.

Means for Achieving the Object

In order to achieve this object, the present invention provides a vehicle hydraulic brake system of the brake-by-wire type, which is configured to adjust, in a pressure regulator, hydraulic pressure supplied from a high hydraulic pressure source to a value corresponding to braking operation, or to a value necessary to generate a target braking force set by an electronic control unit, actuate a master cylinder under the thus adjusted hydraulic pressure, generating a brake hydraulic pressure, and supply the brake hydraulic pressure to wheel cylinders, and which further includes the following features.

That is, the brake system according to the present invention comprises an input piston configured to be advanced under the brake operating force, a first fluid chamber defined in a housing and configured such that the volume of the first fluid chamber changes corresponding to the amount of advancement and retraction of the input piston, a second fluid chamber defined in the housing and configured such that the adjusted hydraulic pressure is introduced into the second fluid chamber and is applied to a master piston of a master cylinder, a third fluid chamber kept at the atmospheric pressure, a stroke simulator configured to generate a reaction force to the brake operation corresponding to a change in volume of the first fluid chamber, a partition member fixedly fitted in a bore of the housing and partitioning each of the second fluid chamber and the third fluid chamber from the first fluid chamber, a first seal member disposed in a fitting gap defined between the bore of the housing and a portion of the partition member fitted in the bore and defining the second fluid chamber, the first seal member isolating the second fluid chamber from the first fluid chamber, a second seal member disposed in a fitting gap defined between the bore of the housing and a portion of the partition member fitted in the bore and defining the third fluid chamber, the second seal member isolating the third fluid chamber from the first fluid chamber, and an annular member disposed between the first seal member and the second seal member and having two ends which are in abutment with the first seal member and the second seal member, respectively, wherein the annular member divides a space defined between the outer periphery of the partition member and the bore of the housing into a first space portion configured such that the volume of the first space portion increases when the annular member moves in one axial direction, and into a second space portion configured such that the volume of the second space portion decreases when the annular member moves in the one axial direction, and wherein the first space portion and the second space portion are in communication with each other, and are further configured such that the volume of the first fluid chamber increases by the same amount by which the volume of the second fluid chamber decreases, when the annular member moves in the one axial direction.

This vehicle hydraulic brake system is preferably configured as follows:

(1) The first space portion communicates with the second space portion through a communication passage formed in the annular member;

(2) The fitting gap sealed by the first seal member has a diameter different from the diameter of the fitting gap sealed by the second seal member, and one of the first and second space portions, which are divided by the annular member, is defined around the outer periphery of the annular member and the other of the first and second space portions is defined within the inner periphery of the annular member; and/or.

(3) The portion of the partition member defining the second fluid chamber and the portion of the partition member defining the third fluid chamber are separate members from each other and fitted in the bore of the housing so as to be in abutment with each other in the axial direction.

The vehicle hydraulic brake system according to the present invention may further include an ABS unit having pressure-reducing and pressure-increasing electromagnetic valves for adjusting wheel cylinder hydraulic pressure under the command of the electronic control unit and capable of performing anti-skid control too.

Advantages of the Invention

The vehicle hydraulic brake system according to the present invention is a brake-by-wire system in which the master cylinder is actuated under hydraulic pressure generated in the first fluid chamber as well as hydraulic pressure introduced into the second fluid chamber (assist pressure), separately from the input piston. Thus, this brake system can perform regenerative cooperative braking and/or automatic braking.

Since the master piston, which receives pressure in the second fluid chamber, is separated from the input piston, the input piston will never be pulled by the master piston when hydraulic pressure from the high pressure source is introduced into the second fluid chamber.

When high hydraulic pressure is introduced into the second fluid chamber, the first seal member, which is fitted in the fitting gap of the portion of the partition member defining the second fluid chamber, is pushed and moved toward the first fluid chamber under hydraulic pressure in the second fluid chamber. (The seal member is movable because there is a play between the seal member and the groove in which the seal member is fitted so as to cope with e.g. expansion of the seal member.) While such movement is not very large, considering the fact that today's brake systems are extremely small compared to older ones, even a small movement of the first seal member could lead to rather large change in volume of the first fluid chamber of such a small brake system.

Thus, a change in volume of the first fluid chamber due to the movement of the first seal member could deteriorate the braking operating feeling. The brake system according to the present invention is free of this problem too.

In particular, the brake system according to the present invention is configured such that when the first seal member is moved in the axial direction, the annular member is moved in the same direction, while compressing the second seal member. As a result, the volume of the second space portion decreases, while the volume of the first space portion increases by the same amount by which the second space portion decreases. Due to this fact, and since the first and second space portions both communicate with the first fluid chamber, the volume of the first fluid chamber remains unchanged. This prevents fluctuations in reaction force to the brake operating force, and thus prevents deterioration in brake operating feeling resulting from fluctuations in reaction force to the brake operating force.

The first and second fluid chambers are preferably brought into communication with each other through a communication passage formed in the annular member, because such a communication passage is easier to form and simpler in structure than a similar communication passage formed in the housing or the partition member.

In the arrangement in which the fitting gap sealed by the first seal member has a diameter different from the diameter of the fitting gap sealed by the second seal member, and in which one of the first and second space portions is defined around the outer periphery of the annular member and the other of the first and second space portions is defined within the inner periphery of the annular member, a stepped sleeve may be used as the annular member. Such a stepped sleeve makes it easier to configure the first and second space portions such that their respective volumes increase and decrease by the same amount.

In the arrangement in which the portion of the partition member defining the second fluid chamber and the portion of the partition member defining the third fluid chamber are separate members from each other, with the first seal member fitted on the partition member, the first seal member can be mounted in position and dismounted, together with the partition member.

BEST MODE FOR EMBODYING THE INVENTION

Figure 1:
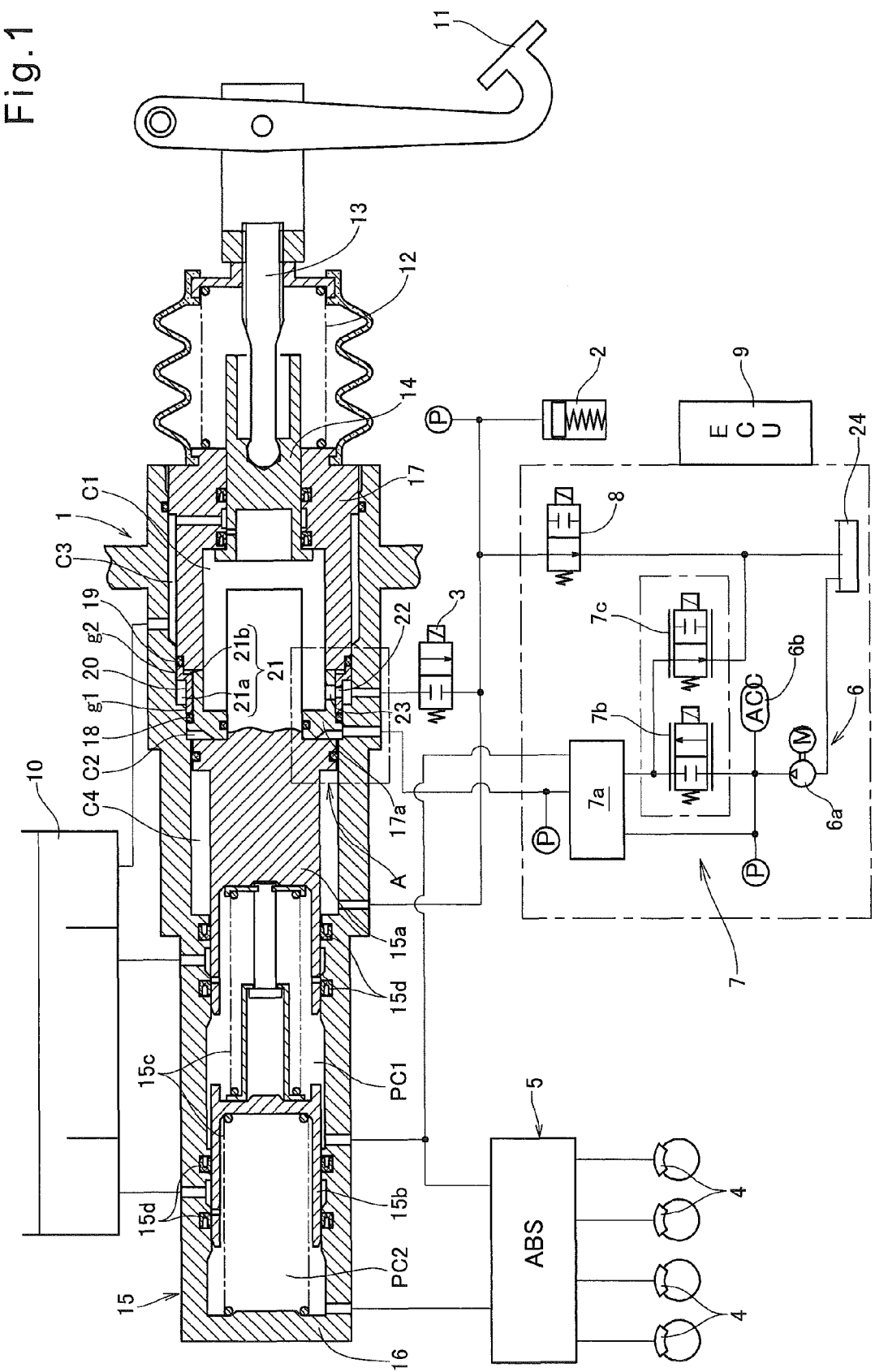
FIG. 1 is a sectional view of a vehicle hydraulic brake system according to the present invention.
Figure 2:
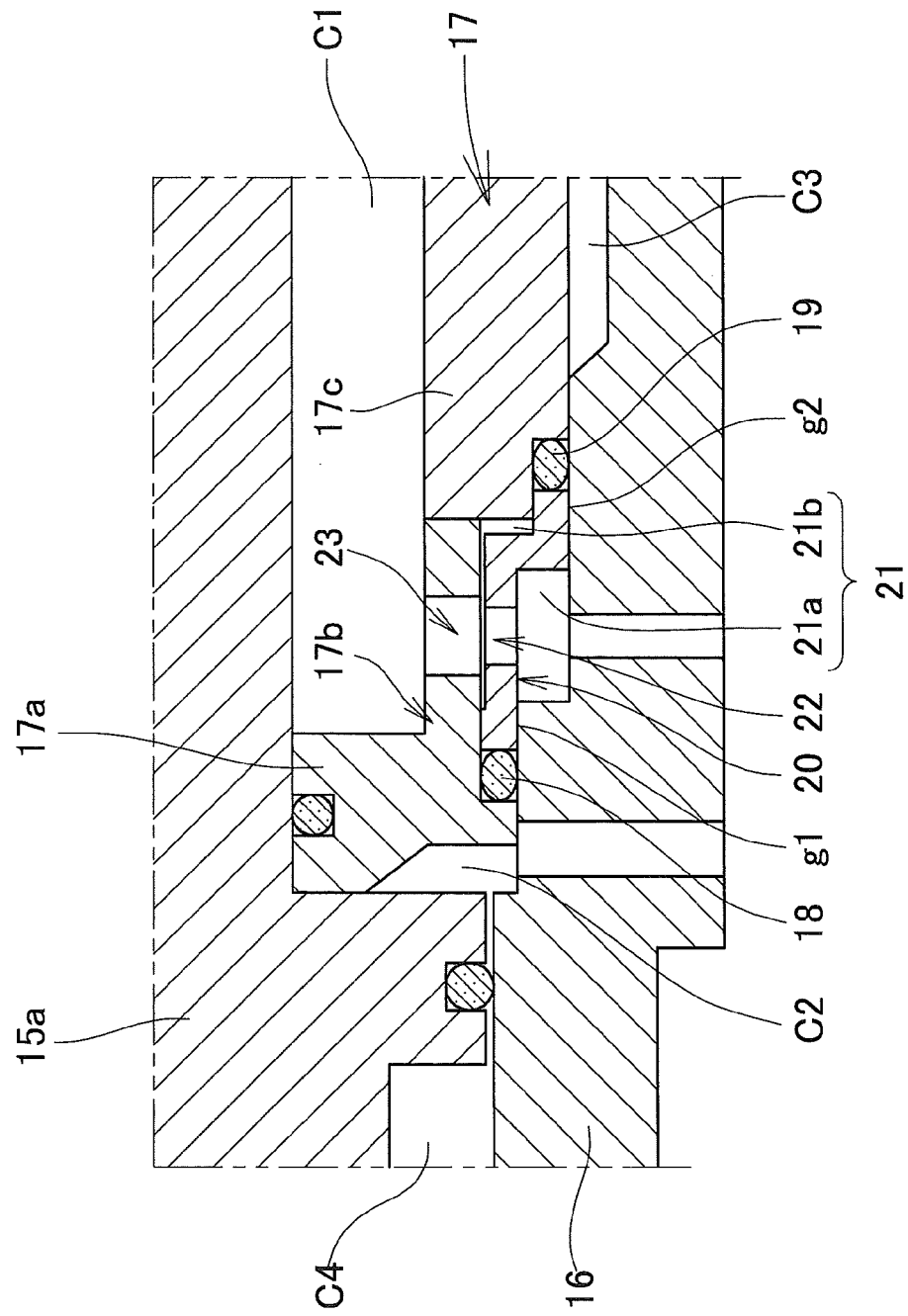
FIG. 2 is an enlarged view of a portion of FIG. 1 indicated by the letter "A".
Figure 3:
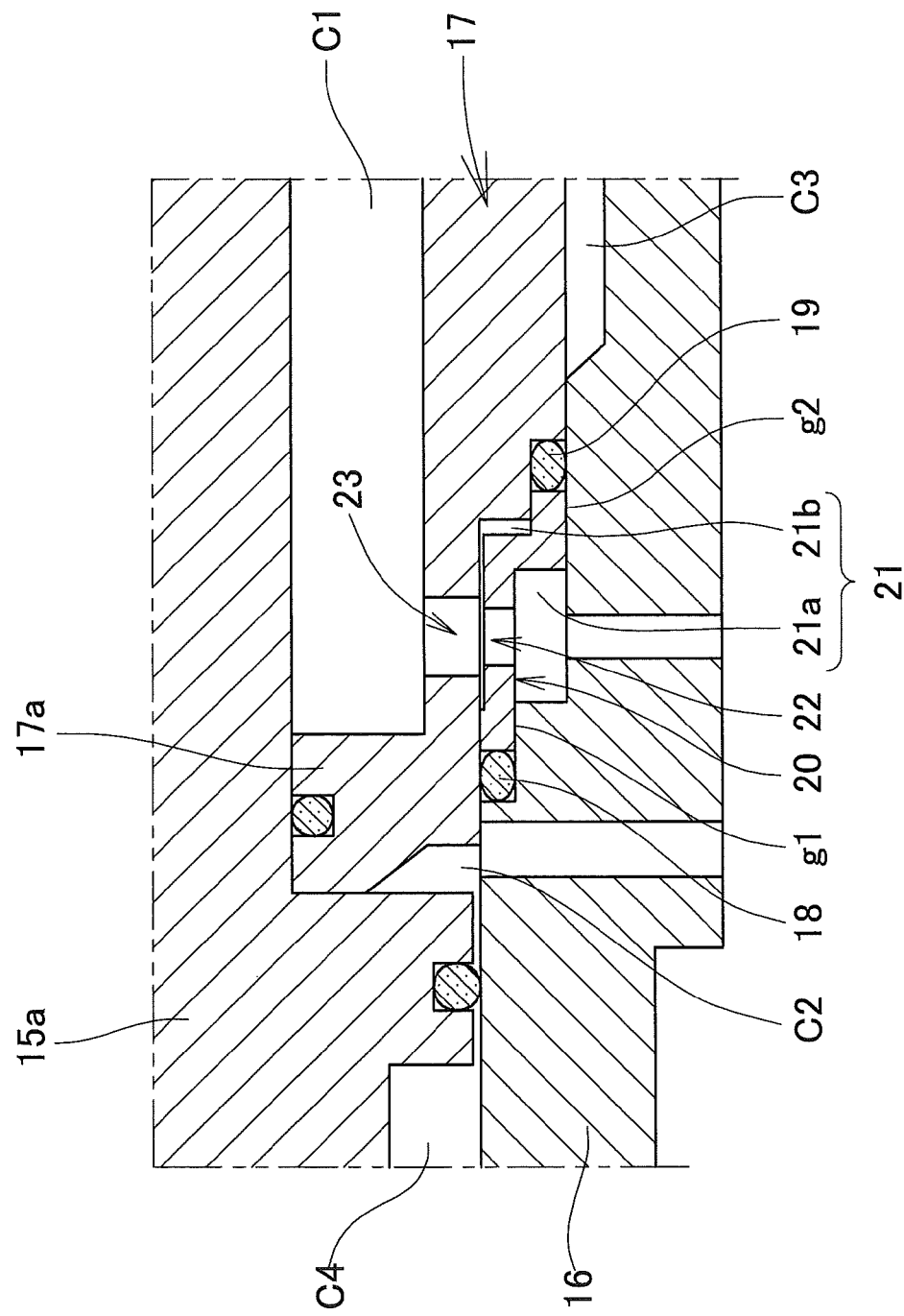
FIG. 3 is a sectional view of and around a partition member of which portions defining second and third fluid chambers are integral with each other.

Now referring to FIGS. 1-3, a vehicle hydraulic brake system embodying the present invention is described. As shown in FIG. 1, this vehicle hydraulic brake system includes a brake hydraulic pressure generator 1; a stroke simulator 2 which generates an operating reaction force corresponding to the brake operating amount; an electromagnetic on-off valve 3 which changes the way the stroke simulator 2 is connected to the brake hydraulic pressure generator 1; wheel cylinders 4 which are actuated under hydraulic pressure generated by the brake hydraulic pressure generator 1, thereby applying braking force to the respective vehicle wheels; and an ABS unit 5 for adjusting, as necessary, brake hydraulic pressure supplied from the brake hydraulic pressure generator 1 to the wheel cylinders 4.

This brake system further includes a high hydraulic pressure source 6; a pressure regulator 7 for adjusting the hydraulic pressure supplied from the hydraulic pressure source 6 to a value necessary to generate a target braking force; an electromagnetic on-off valve 8 for selectively opening and closing a discharge line leading to a sub-reservoir 24 (which may be omitted, in which case the reservoir 10 serves also as the sub-reservoir); and an electronic control unit (ECU) 9 configured to set the target braking force based on information from various known sensors such as a sensor for detecting how the brake is being operated and a sensor for detecting the behavior of the vehicle, and issue a command to adjust pressure to the pressure regulator 7. In particular, the electronic control unit 9 sets the target braking force based on information from various known sensors such as a sensor for detecting how the brake is being operated and a sensor for detecting the behavior of the vehicle, and controls the pressure regulator 7 such that hydraulic pressure introduced into a second fluid chamber from the high hydraulic pressure source 6 is adjusted to a value necessary to generate the target braking force.

The brake hydraulic pressure generator 1 includes the reservoir 10. The brake hydraulic pressure generator 1 shown comprises a brake pedal 11, a return spring 12 biasing the brake pedal 11 in the return direction, an input rod 13 connected to the brake pedal 11, an input piston 14 configured to advance under the brake operating force transmitted from the brake pedal 11 through the input rod 13, and a tandem master cylinder 15.

The input piston 14 and the master cylinder 15 are mounted in a housing 16. The housing 16 defines a bore in which a stationary partition member 17 is mounted. The input piston 14 extends through the partition member 17 such that the partition member 17 defines therein a first fluid chamber (reaction force chamber) C1 whose volume changes when the input piston 14 is advanced and retracted. The first fluid chamber C1 is connected to the stroke simulator 2 through the electromagnetic on-off valve 3, which selectively seals and unseals the first fluid chamber C1. A second fluid chamber C2 is defined forwardly of the first fluid chamber C1 through a partition wall 17a formed at the front end of the partition member 17. A third fluid chamber C3 is defined around the rear portion of the partition member 17 so as to communicate with the reservoir 10.

The master cylinder 15 includes a master piston (primary piston) 15a liquid-tightly and axially slidably extending through the partition wall 17a. The master piston 15a has an intermediate large-diameter portion having its back side facing the second fluid chamber C2. A fourth fluid chamber (second reaction force chamber) C4 is defined around the portion of the master piston 15a located forwardly of the intermediate large-diameter portion. The fourth fluid chamber C4 is also connected to the stroke simulator 2. With this arrangement, when the master piston 15a is advanced, the volume of the fourth fluid chamber C4 decreases while the volume of the first fluid chamber C1 increases. The portions of the master piston 15a that are involved in changing these volumes have such diameters that when the master piston 15a is advanced, the volume of the fourth fluid chamber C4 decreases by the same amount by which the volume of the first fluid chamber C1 increases.

The master cylinder 15 includes two master pistons (the above-mentioned primary piston 15a and a secondary piston 15b), return springs 15c biasing the respective master pistons in the returning direction, and cup seals 15d sealing the outer peripheries of the respective master pistons. The master pistons 15a and 15b pressurize brake fluid in the respective pressure chambers PC1 and PC2, thereby generating brake hydraulic pressure. The master cylinder itself is known in the art.

The ABS unit 5 is a known pressure regulating unit including pressure reducing electromagnetic valves (not shown) for reducing, as necessary, the hydraulic pressure in the respective wheel cylinders 4, and pressure increasing electromagnetic valves (not shown either) for increasing, as necessary, the hydraulic pressure in the respective wheel cylinders 4.

The hydraulic pressure source 6, which includes a motor-driven pump 6a and a pressure accumulator 6b, is also known in the art.

The pressure regulator 7 includes a known pressure regulating valve 7a, a pressure increasing linear electromagnetic valve 7b, and a pressure reducing linear electromagnetic valve 7c. The pressure increasing linear electromagnetic valve 7b and the pressure reducing linear electromagnetic valve 7c are controlled under the command of the electronic control unit 9. In particular, the ECU 9 adjusts the hydraulic pressure introduced into a hydraulic pressure chamber (not shown) defined in the pressure regulating valve 7a from the hydraulic pressure source 6 such that a control piston (now shown) is displaced to a position corresponding to the adjusted hydraulic pressure, thereby adjusting the degree of opening of the valve portion of the pressure regulating valve 7a.

The pressure regulating valve 7a thus adjusts the hydraulic pressure supplied from the hydraulic pressure source 6 to a pressure value set by electronic control unit 9 (which is assist pressure corresponding to brake operation during normal braking or regenerative cooperative braking). The thus adjusted hydraulic pressure is introduced into the second fluid chamber C2 as assist pressure. This hydraulic pressure actuates the master cylinder 15, thus generating brake hydraulic pressure necessary to generate the target braking force.

The elements designated by the letter "P" in FIG. 1 are pressure sensors configured to detect hydraulic pressure at designated positions. In the brake system shown, three pressure sensors P are provided at a position for detecting the pressure introduced into the stroke simulator 2, a position for detecting boost pressure introduced into the second fluid chamber C2, and a position for detecting the pressure of the hydraulic pressure source 6, respectively.

A first seal member 18 is disposed in a fitting gap g1 between the bore of the housing 16 and a portion 17b of the partition member 17 fitted in the bore of the housing 16 and defining the second fluid chamber C2, to keep the second fluid chamber C2 isolated from the first fluid chamber C1. A second seal member 19 is disposed in a fitting gap g2 between the bore of the housing 16 and a portion 17c of the partition member 17 fitted in the bore of the housing 16 and defining the third fluid chamber C3, to keep the third fluid chamber C3 isolated from the first fluid chamber C1. The fitting gap g2 has a larger diameter than the fitting gap g1. The first and second seal members 18 and 19 may both be O-rings.

An annular member 20 is axially movably disposed between the first seal member 18 and the second seal member 19 such that the ends of the annular member 20 are elastically restrained by the first and second seal members 18 and 19 by being brought into abutment with the first and second seal members 18 and 19. The annular member 20 is axially movable until the second seal member 19 is compressed to the maximum.

As shown in FIG. 2 in a detailed manner, a space 21 is formed between the outer periphery of the partition member 17 and the bore of the housing 16. The annular member 20 divides the space 21 into a first space portion 21a and a second space portion 21b. In particular, the annular member 20 is a stepped sleeve including a small-diameter portion having an outer periphery defining the first space portion 21a, and a large-diameter portion having an inner periphery defining the second space portion 21b. With this arrangement, it is possible to easily adjust the volumes by which the first space portion 21a and the second space portion 21b increase or decrease.

The first space portion 21a and the second space portion 21b communicate with each other through a communication passage 22 formed in the annular member 20 and a communication passage 23 formed in the partition member 17. Also, the first space portion 21a and the second space portion 21b are designed such that when the annular member 20 moves in one axial direction, the volume of the first space portion 21a increases by the same amount by which the volume of the second space portion 21b decreases.

In the vehicle hydraulic brake system of FIG. 1, when the brake pedal 11 is depressed, the electromagnetic on-off valve 3 opens, bringing the first fluid chamber C1 into communication with the stroke simulator 2. In this state, hydraulic pressure from the hydraulic pressure source 6 is introduced, as assist pressure, into the second fluid chamber C2, after being adjusted by the pressure regulator 7 to a value corresponding to the brake operating amount. Under this assist pressure, the master piston 15a is advanced and the master cylinder 15 is actuated, generating brake hydraulic pressure in the pressure chambers PC1 and PC2.

Because the first and fourth fluid chambers C1 and C4 are designed such that when the master piston 15a is advanced, the volume of the first fluid chamber C1 increases by the same amount by which the volume of the fourth fluid chamber C4 decreases, and because the first and fourth fluid chambers are in communication with each other, brake fluid in the fourth fluid chamber C4 is released into the first fluid chamber C1 when the master piston is advanced.

With this arrangement, since the master cylinder 15 is separated from the input piston 14 during braking, when hydraulic pressure is introduced into the second fluid chamber from the high hydraulic pressure source, the input piston will never be pulled by the master piston. Since the first and fourth fluid chambers are designed such that when the master piston 15a is advanced, the volume of the first fluid chamber C1 increases by the same amount by which the volume of the fourth fluid chamber C4 decreases, and the first and fourth fluid chambers C1 and C4 are in communication with each other, reaction force to the brake operation applied to the brake pedal corresponds to the brake operating amount, thus improving brake operating feeling.

When high hydraulic pressure is introduced into the second fluid chamber C2, and the first seal member 18 is moved in one axial direction (rightwardly in FIGS. 1 and 2), the annular member 20 is moved in the same direction, while compressing the second seal member 19. This reduces the volume of the second space portion 21b, and simultaneously increases the volume of the first space portion 21a by the same amount. Because the volume of the second space portion 21b decreases by the same amount by which the volume of the first space portion 21a increases, and because the first space portion 21a and the second space portion 21b are both in communication with the first fluid chamber C1, the volume of the first fluid chamber C1 never fluctuates. This prevents fluctuations in reaction force to the brake operating amount, and thus prevents deterioration in brake operating feeling resulting from such fluctuations in reaction force.

In the brake system shown, during normal braking, in order to reduce fluctuations in reaction force when the master piston 15a is advanced, the electromagnetic on-off valve 3 is kept open while the electromagnetic on-off valve 8 is closed, thereby sealing the first fluid chamber C1 and the fourth fluid chamber C4, while keeping the chambers C1 and C4 in communication with each other.

If the electric system fails, the electromagnetic on-off valve 3 is closed and the electromagnetic on-off valve 8 is opened, thus sealing the first fluid chamber C1. Since the first fluid chamber C1 is sealed, when the input piston 14 is moved, the master piston 15a is actuated under hydraulic pressure in the first fluid chamber C1, enabling the master cylinder to generate brake hydraulic pressure corresponding to the brake operating force applied by the driver. Thus, even during a failure of the electric system, the brakes can be applied safely.

In the brake system shown in FIG. 1, the portions 17b and 17c of the partition member 17, which define the second and third fluid chambers, respectively, are two separate members fitted in the bore of the housing 16 while kept in abutment with each other in the axial direction. This arrangement is advantageous in that with the first seal member 18 fitted on the outer periphery of the partition member 17, the first seal member 18 can be mounted in position and dismounted, together with the partition member 17. But instead, as shown in FIG. 3, the portions 17b and 17c of the partition wall 17 may be integral with each other.

DESCRIPTION OF THE NUMERALS

1. Brake hydraulic pressure generator
2. Stroke simulator
3, 8. Electromagnetic on-off valve
4. Wheel cylinder
5. ABS unit
6. Hydraulic pressure source
6a. Pump
6b. Pressure accumulator
7. Pressure regulator
7a. Pressure regulating valve
7b. Pressure increasing linear electromagnetic valve
7c. Pressure reducing linear electromagnetic valve
9. Electronic control unit
10. Reservoir
11. Brake pedal
12. Return spring
13. Input rod
14. Input piston
15. Master cylinder
15a, 15b. Master piston
15c. Return spring
15d. Cup seal
16. Housing
17. Partition member
17a. Partition wall
17b. Portion of the partition member defining the second fluid chamber
17c. Portion of the partition member defining the third fluid chamber
18. First seal member
19. Second seal member
20. Annular member
21. Space
21a. First space portion
21b. Second space portion
22, 23. Communication passage
24. Sub-reservoir
C1-C4. First to fourth fluid chambers
g1, g2. Fitting gap
P. Pressure sensor

What is claimed is:
1. A vehicle hydraulic brake system configured to adjust, in a pressure regulator, hydraulic pressure supplied from a high hydraulic pressure source to a value corresponding to braking operation, or to a value necessary to generate a target braking force set by an electronic control unit, actuate a master cylinder under the thus adjusted hydraulic pressure, generating a brake hydraulic pressure, and supply the brake hydraulic pressure to wheel cylinders, wherein the brake system comprises an input piston configured to be advanced under a brake operating force, a first fluid chamber defined in a housing and configured such that a volume of the first fluid chamber changes corresponding to an amount of advancement and retraction of the input piston, a second fluid chamber defined in the housing and configured such that the adjusted hydraulic pressure is introduced into the second fluid chamber and is applied to a master piston of the master cylinder), a third fluid chamber kept at an atmospheric pressure, a stroke simulator configured to generate a reaction force to the brake operation corresponding to a change in volume of the first fluid chamber, a partition member fixedly fitted in a bore of the housing and partitioning each of the second fluid chamber and the third fluid chamber from the first fluid chamber, a first seal member disposed in a fitting gap defined between the bore of the housing and a portion of the partition member fitted in the bore and defining the second fluid chamber the first seal member isolating the second fluid chamber from the first fluid chamber a second seal member disposed in a fitting gap defined between the bore of the housing and a portion of the partition member fitted in the bore and defining the third fluid chamber, the second seal member isolating the third fluid chamber from the first fluid chamber, and an annular member disposed between the first seal member and the second seal member and having two ends which are in abutment with the first seal member and the second seal member, respectively, wherein the annular member divides a space defined between an outer periphery of the partition member and the bore of the housing into a first space portion configured such that a volume of the first space portion increases when the annular member moves in one axial direction, and into a second space portion configured such that a volume of the second space portion decreases when the annular member moves in the one axial direction, and wherein the first space portion and the second space portion are in communication with the first fluid chamber, and are further configured such that the volume of the first space portion increases by a same amount by which the volume of the second space portion decreases, when the annular member moves in the one axial direction.

2. The vehicle hydraulic brake system of claim 1,
wherein the first space portion communicates with the second space portion through a communication passage) formed in the annular member.

3. The vehicle hydraulic brake system of claim 2, wherein the first fitting gap has a diameter different from a diameter of the second fitting gap, and wherein one of the first and second space portions is defined around an outer periphery of the annular member and the other of the first and second space portions is defined within an inner periphery of the annular member.

4. The vehicle hydraulic brake system of claim 3, wherein the portion of the partition member defining the second fluid chamber and the portion of the partition member defining the third fluid chamber are separate members from each other and fitted in the bore of the housing so as to be in abutment with each other in an axial direction.

5. The vehicle hydraulic brake system of claim 2, wherein the portion of the partition member defining the second fluid chamber and the portion of the partition member defining the third fluid chamber are separate members from each other and fitted in the bore of the housing so as to be in abutment with each other in an axial direction.

6. The vehicle hydraulic brake system of claim 1, wherein the first fitting gap has a diameter different from a diameter of the second fitting gap, and wherein one of the first and second space portions, which are divided by the annular member, is defined around an outer periphery of the annular member and the other of the first and second space portions is defined within an inner periphery of the annular member.

7. The vehicle hydraulic brake system of claim 6, wherein the portion of the partition member defining the second fluid chamber and the portion of the partition member defining the third fluid chamber are separate members from each other and fitted in the bore of the housing so as to be in abutment with each other in an axial direction.

8. The vehicle hydraulic brake system of claim 1, wherein the portion of the partition member defining the second fluid chamber and the portion of the partition member defining the third fluid chamber are separate members from each other and fitted in the bore of the housing so as to be in abutment with each other in an axial direction.

* * * * *